(12) United States Patent
Maas et al.

(10) Patent No.: US 11,325,088 B2
(45) Date of Patent: May 10, 2022

(54) METHOD OF CLEANING SPENT CATALYST MATERIAL

(71) Applicant: SHELL OIL COMPANY, Houston, TX (US)

(72) Inventors: Edwin Maas, Katy, TX (US); Ruud Kneppers, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 16/738,983

(22) Filed: Jan. 9, 2020

(65) Prior Publication Data

US 2020/0147571 A1     May 14, 2020

Related U.S. Application Data

(62) Division of application No. 15/347,035, filed on Nov. 9, 2016, now Pat. No. 10,562,002.

(60) Provisional application No. 62/252,676, filed on Nov. 9, 2015.

(51) Int. Cl.
| | |
|---|---|
| *B01J 8/00* | (2006.01) |
| *B01J 8/02* | (2006.01) |
| *B01D 29/23* | (2006.01) |
| *B01D 29/96* | (2006.01) |
| *B01D 35/02* | (2006.01) |

(52) U.S. Cl.
CPC ............. *B01J 8/008* (2013.01); *B01D 29/23* (2013.01); *B01D 29/96* (2013.01); *B01D 35/02* (2013.01); *B01J 8/0085* (2013.01); *B01J 8/0221* (2013.01); *B01D 2201/4053* (2013.01); *B01D 2201/4092* (2013.01); *B01J 8/0214* (2013.01); *B01J 2208/00814* (2013.01); *B01J 2208/00884* (2013.01)

(58) Field of Classification Search
CPC ......... B01J 8/0214; B01J 8/0221; B01J 37/06
See application file for complete search history.

(56) References Cited

U.S. PATENT DOCUMENTS

| | | | |
|---|---|---|---|
| 3,016,984 A | | 1/1962 | Getzin |
| 5,271,136 A | * | 12/1993 | Skoworodko ......... B25B 27/023 29/257 |
| 6,210,577 B1 | | 4/2001 | Garber |
| 7,226,568 B1 | | 6/2007 | Ham et al. |
| 8,398,930 B2 | | 3/2013 | Naderi |
| 9,597,651 B2 | * | 3/2017 | Combes .................... C01B 3/16 |

(Continued)

FOREIGN PATENT DOCUMENTS

| | | |
|---|---|---|
| CA | 2576634 A1 | 8/2008 |
| CN | 1477993 A | 2/2004 |

(Continued)

OTHER PUBLICATIONS

International Search Report and Written Opinion received for PCT Patent Application No. PCT/US2016/061068, dated Feb. 10, 2017, 09 pages.

*Primary Examiner* — Benjamin M Kurtz
(74) *Attorney, Agent, or Firm* — Shell USA, Inc.

(57) ABSTRACT

A method of cleaning spent catalyst material from a catalyst filter basket. The catalyst filter basket includes a central frame having a base ring and a generally cylindrical inner screen portion which extends upwardly from the base ring. A generally cylindrical outer screen assembly is releasably secured to the central frame by a quick release mechanism.

15 Claims, 9 Drawing Sheets

(56) References Cited

U.S. PATENT DOCUMENTS

2010/0089813 A1    4/2010   Tellier et al.
2013/0153481 A1    6/2013   Havel
2014/0290492 A1   10/2014   Lomax et al.

FOREIGN PATENT DOCUMENTS

| CN | 102046278 A | 5/2011 |
| CN | 202315852 U | 7/2012 |
| CN | 202555257 U | 11/2012 |
| CN | 203525727 U | 4/2014 |
| WO | WO 2014/181080 | * 11/2014 |

* cited by examiner

METHOD OF CLEANING SPENT CATALYST MATERIAL

This application is a divisional of U.S. Non-Provisional application Ser. No. 15/347,035, filed Nov. 9, 2016, which claims priority from the U.S. Provisional Application No. 62/252,676, filed Nov. 9, 2015, which is incorporated herein by reference.

FIELD OF THE INVENTION

The invention relates generally to the design of filter baskets used to retain solid catalytic materials in a catalytic reactor.

BACKGROUND OF THE INVENTION

Catalytic reactors are used in chemical processing. A chemical feed is flowed over or through a solid, typically granular, catalyst material to induce or accelerate desired chemical reactions.

SUMMARY OF THE INVENTION

The invention provides a catalyst filter basket for use in a catalytic reactor. The described catalytic filter basket is designed to retain an amount of solid catalyst and be seated upon a support tray in a reactor. Described catalyst filter baskets have a quickly removable outer screen assembly which allows used catalyst material to be easily removed and replaced.

An exemplary catalyst filter basket is described which includes a central frame having a base ring and a generally cylindrical inner screen which extends axially from the base ring. A generally cylindrical outer screen radially surrounds the inner screen. The outer screen is formed of multiple separate screen portions which are assembled to form a complete cylindrical screen. At least one of the separate screen portions is secured in an easily releasable manner to another of the screen portions and removable from the filter basket upon release. Quick release mechanisms in the forms of a draw bolt and a split key connector are described.

According to preferred embodiments, a locking groove arrangement axially fixes the outer screen assembly upon the central frame. A ridge on the base ring is received within a locking alignment groove in the outer screen portions when the outer screen assembly is assembled onto the central frame. A method of cleaning a catalyst filter basket is also described.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein.

DETAILED DESCRIPTION OF THE INVENTION

Figure 1:
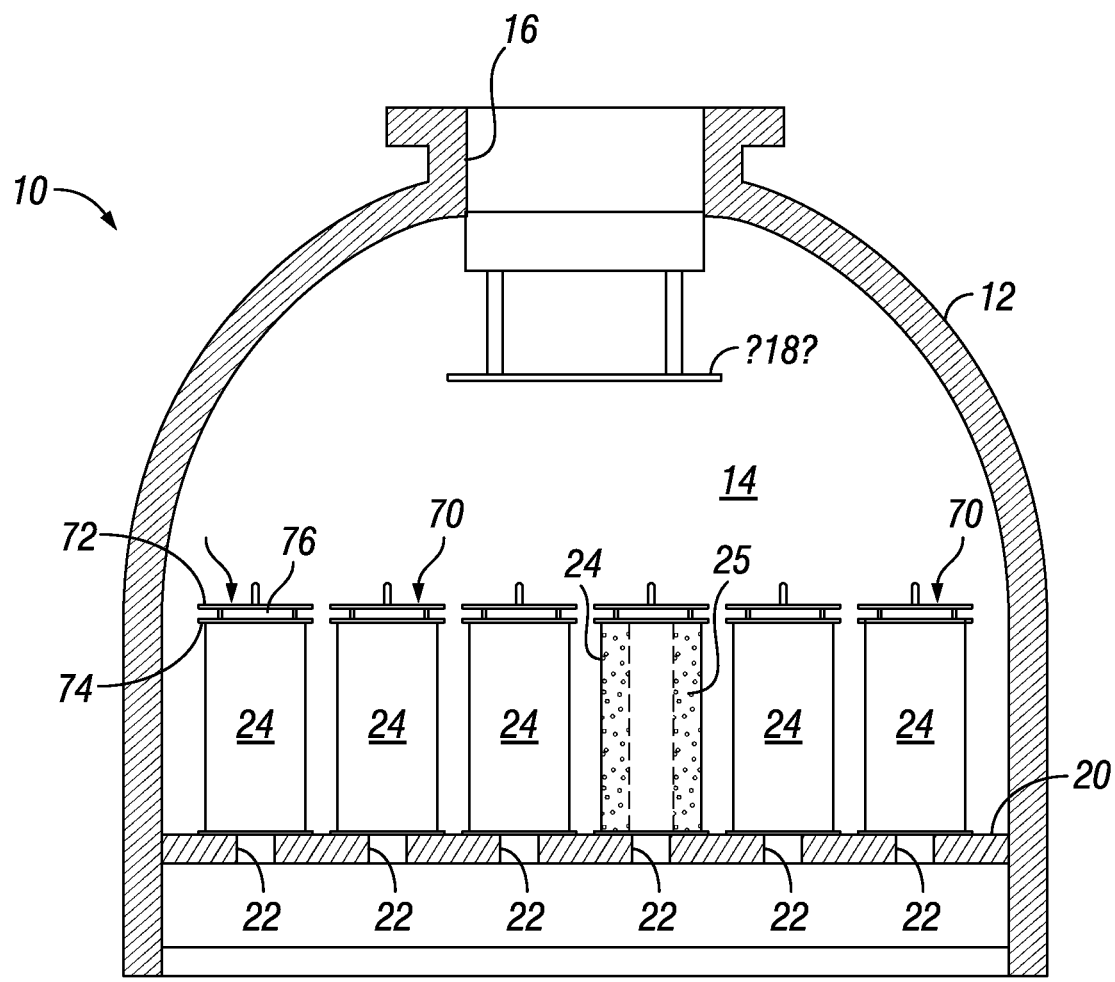
FIG. 1 is a side, cross-sectional view of an exemplary catalytic process reactor which contains a plurality of catalyst filter baskets in accordance with the present invention.

FIG. 1 depicts an exemplary chemical reactor 10 having an outer housing 12 which encloses a chamber 14. In preferred embodiments, the chemical reactor 10 is a catalytic reactor. A feed inlet 16 is located at the top of the housing 12. An impingement plate 18 is suspended below the feed inlet 16. A catalyst support tray 20 is located within the chamber 14 and has a plurality of openings 22 disposed within. Catalyst filter baskets 24 are disposed atop the openings 22 and affixed to the tray 20. Each of the catalyst filter baskets 24 contains a solid catalyst material 25.

FIGS. 2-7 illustrate an exemplary catalyst filter basket 24 in greater detail. The filter basket 24 includes a central frame 26 that includes a base ring 28. A generally cylindrical inner screen portion 30 extends axially from the base ring 28 and defines an open central shaft 32 within. The inner screen portion 30 is formed of mesh or is perforated with openings 34 which will permit fluids to pass through. The base ring 28 has an annular shape and defines a central opening 36. In accordance with a preferred embodiment, the base ring 28 is formed of stacked annular members 38, 40. The lower annular member 40 has a greater outer diameter which provides a lip 42 which can be engaged by locking levers 43 (FIG. 2) to secure the filter basket 24 to the support tray 20.

Figure 2:
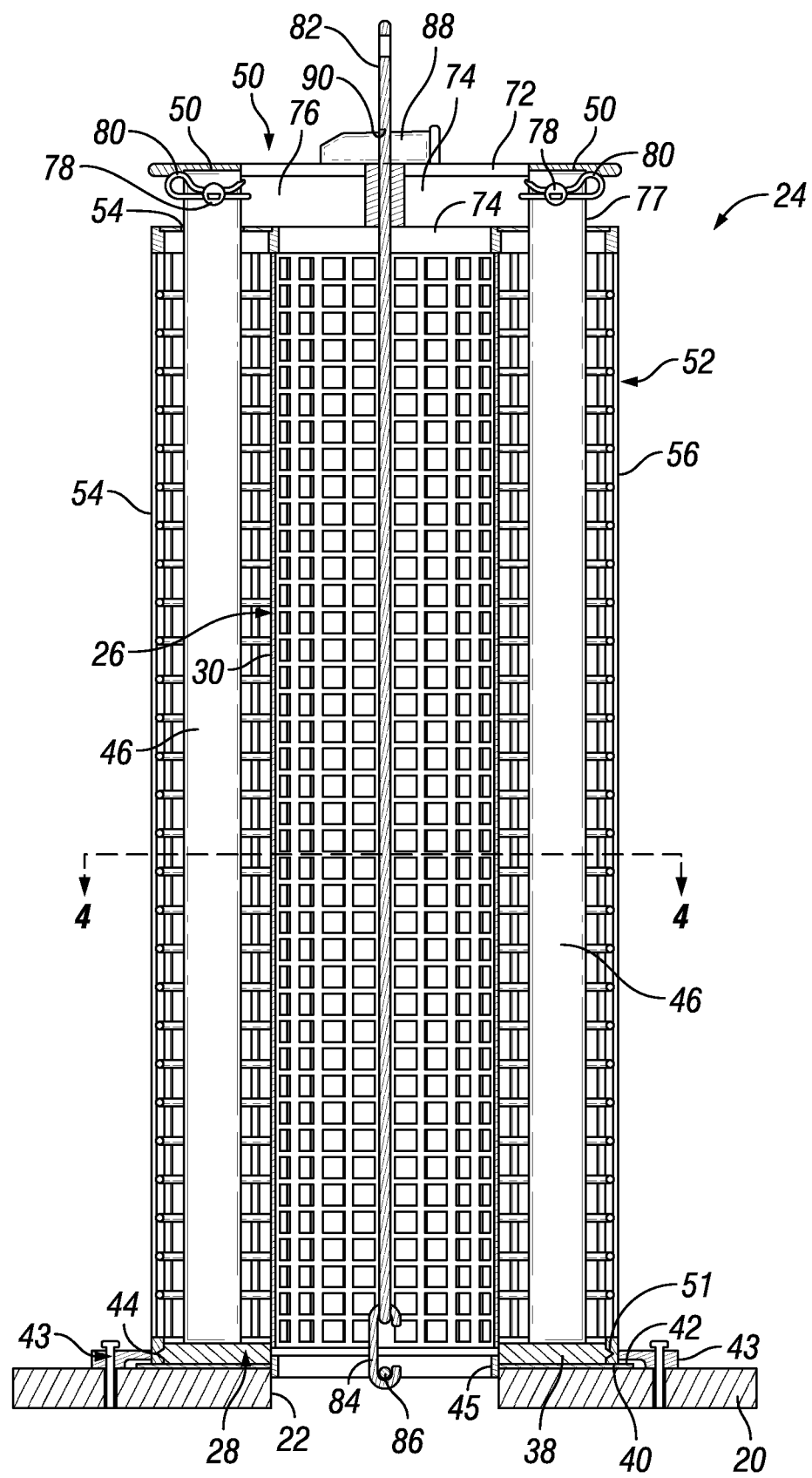
FIG. 2 is a side, cross-sectional view of an exemplary catalyst filter basket constructed in accordance with the present invention.
Figure 3:
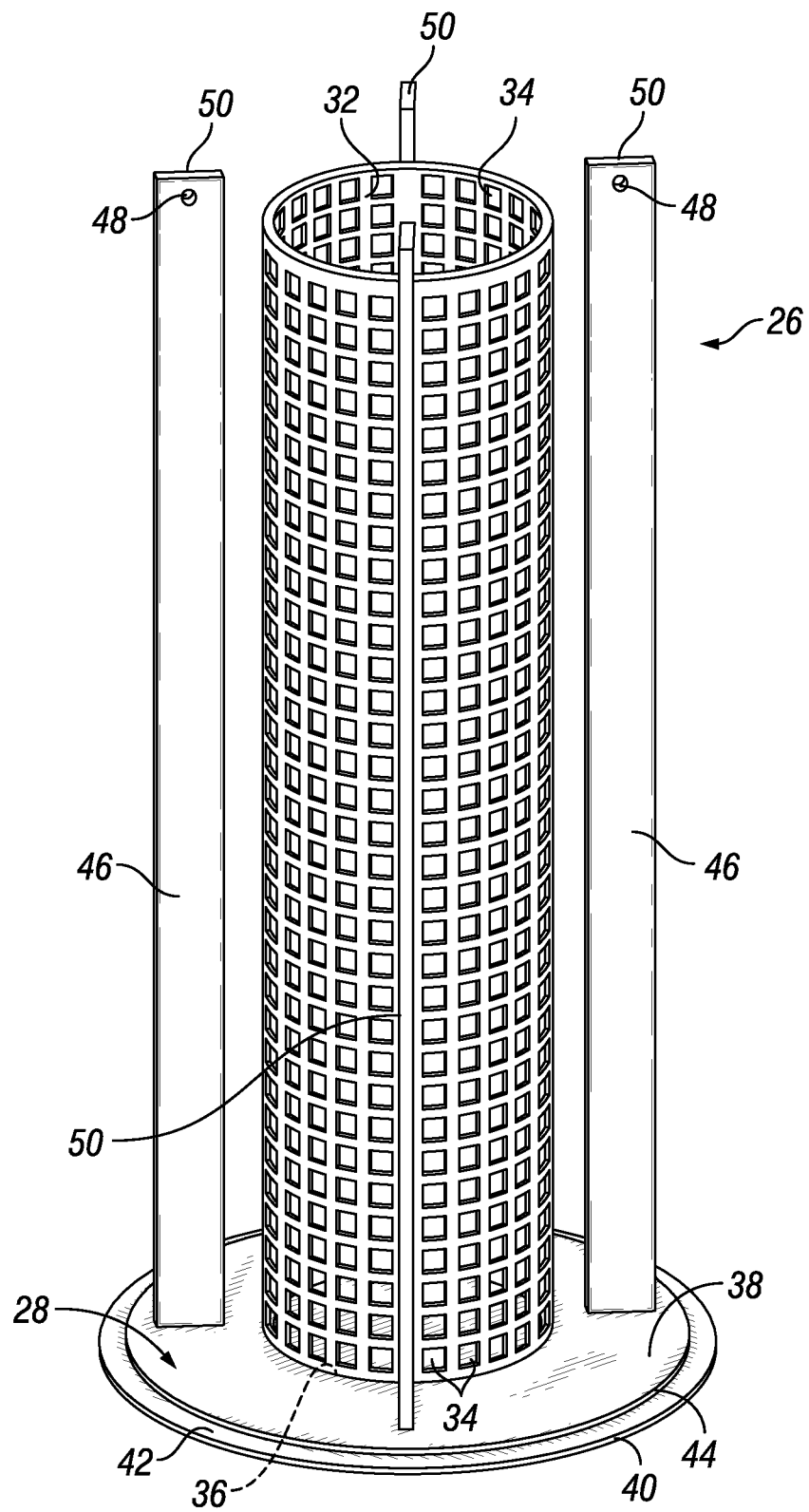
FIG. 3 is an isometric view of an exemplary catalyst filter basket central frame having the outer screen assembly removed.
Figure 5:
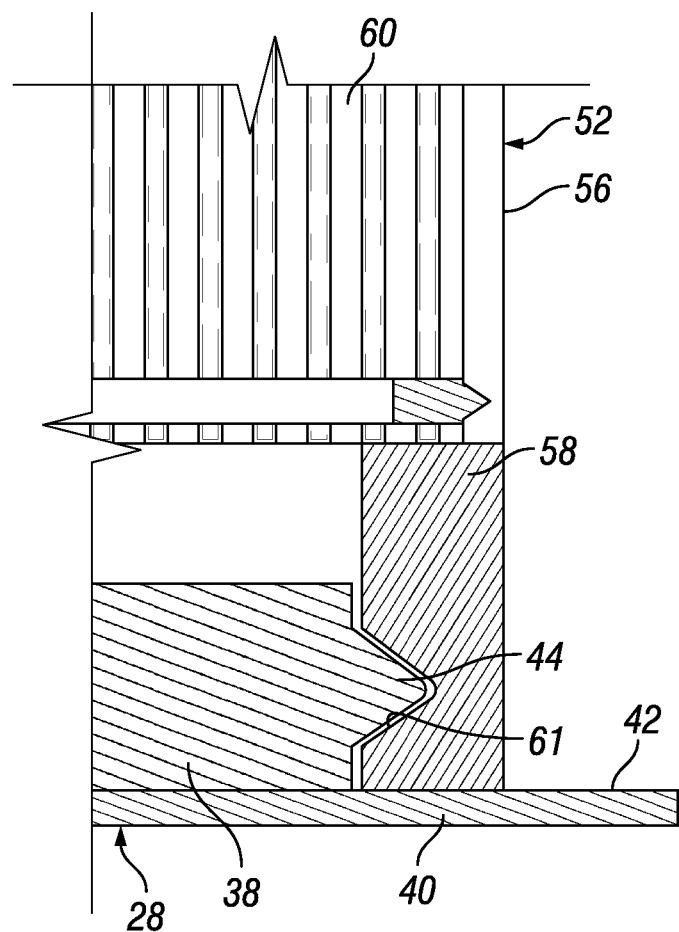
FIG. 5 is a cross-sectional detail view of a portion of the catalyst filter basket which provides an axial locking arrangement between the central frame and the outer screen assembly.
Figure 6:
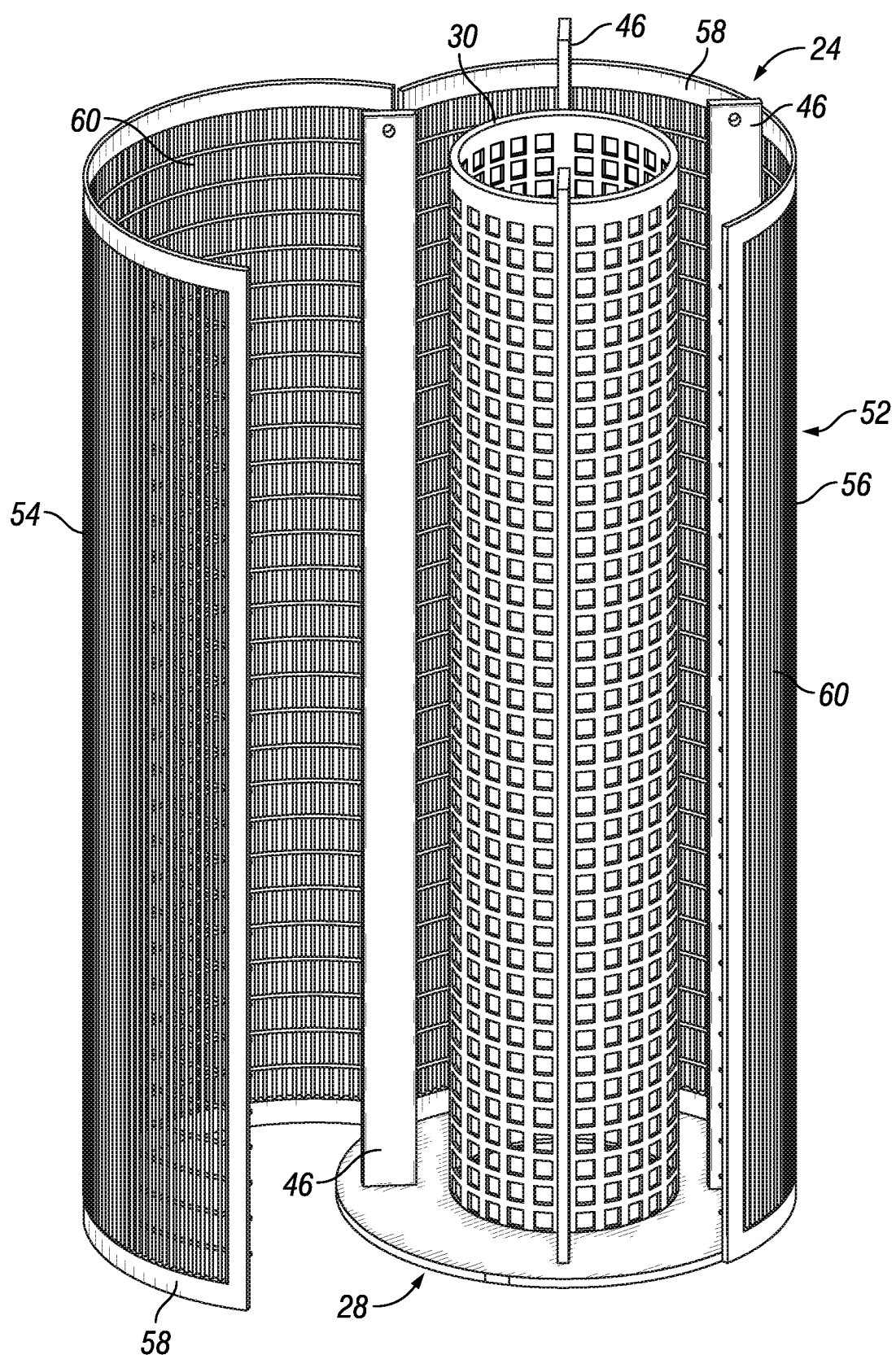
FIG. 6 is an isometric view of the catalyst filter basket of FIGS. 1-5, now with the outer screen assembly partially removed.

As best shown in FIG. 5, an annular ridge 44 projects from the outer circumferential surface of the upper annular member 38 of the base ring 28. In preferred embodiments, the ridge 44 is V-shaped. A centering ring 45 (see FIG. 2) is preferably secured radially within the annular members 38, 40 and preferably projects downwardly below the lower annular member 40 (as seen in FIG. 2). The downwardly projecting portion of the centering ring 45 will extend into an opening 22 in the support tray 20 to help ensure that the catalyst filter basket 24 is properly seated upon the support tray 20.

Support struts 46 extend axially from the base ring 28 and are preferably slightly longer than the inner screen portion 30 of the central frame 26. Openings 48 are disposed through each support strut 46 proximate its upper end 50.

Figure 4:
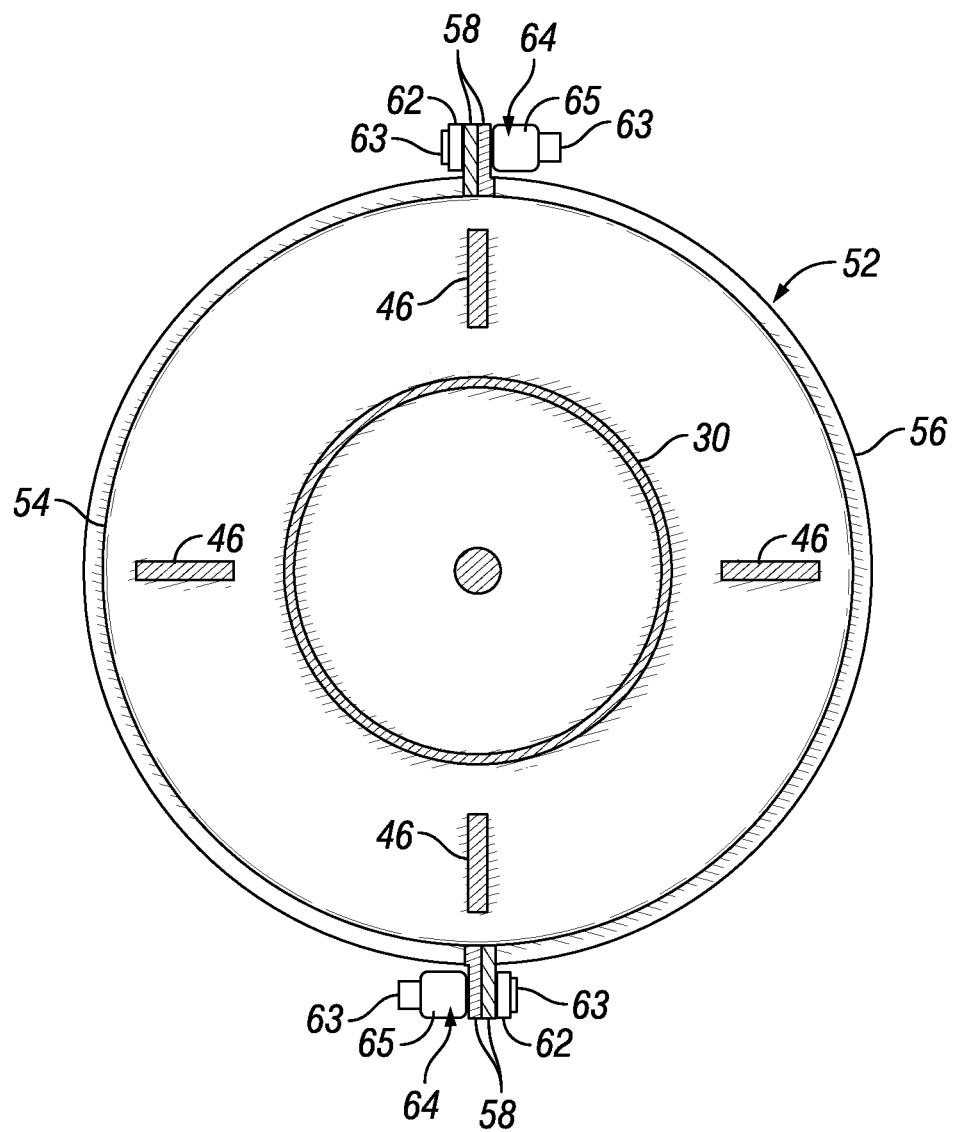
FIG. 4 is an axial cross-sectional view taken along line 4-4 in FIG. 2.

An outer screen assembly 52 radially surrounds the inner screen portion 30. As best shown by FIG. 4, the outer screen assembly 52 is formed of a plurality of separate screen portions 54, 56 which are assembled together to form a complete cylindrical screen assembly. In the depicted embodiment, there are two screen portions 54, 56. However, there may be three or even more screen portions, if desired. In accordance with the present invention, at least one of the screen portions 54, 56 is secured in an easily releasable manner to another of the screen portions 54, 56 and is removable from the filter basket 24 upon release. In accordance with a particularly preferred embodiment, all of the separate screen portions 54, 56 are completely removable from the central frame 26. Preferably, the separate screen portions 54, 56 each have a supporting peripheral frame 58 and a central mesh filtering portion 60, which is porous to permit fluid to pass through the screen portion 54 or 56. The screen portions 54, 56 are curved to provide a semi-circular cross-section, as depicted in FIG. 4. The lower end of the frame 58 of each screen portion 54, 56 includes a locking alignment groove 61 which is shaped and sized to be complementary to the ridge 44 of the base ring 28. As illustrated in FIG. 1, the solid catalyst material 25 is retained in a catalyst storage area which is defined between the inner screen portion 30 and the outer screen assembly 52.

Figure 7:
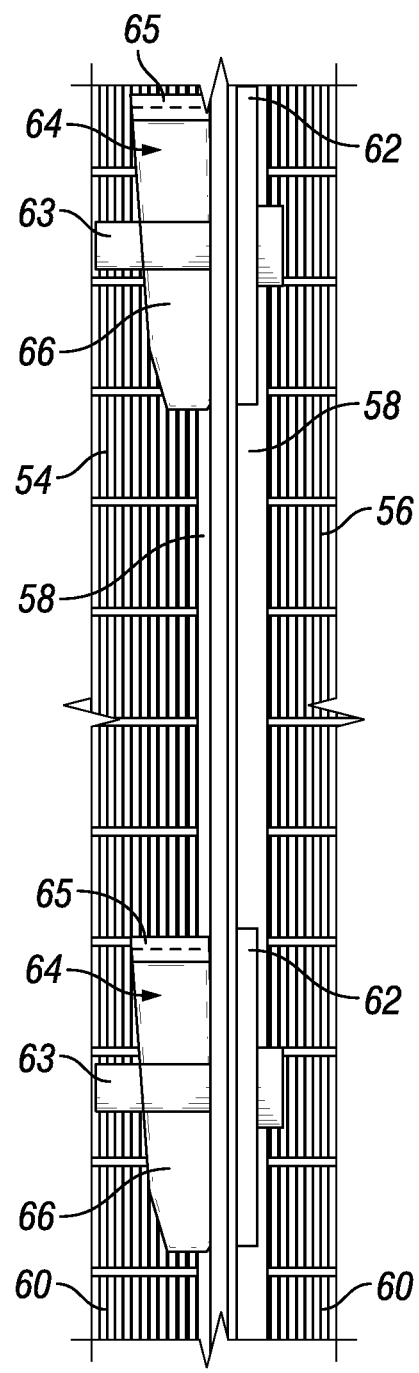
FIG. 7 is an external view of portions of a catalyst filter basket showing split key quick release mechanisms.
Figure 8:
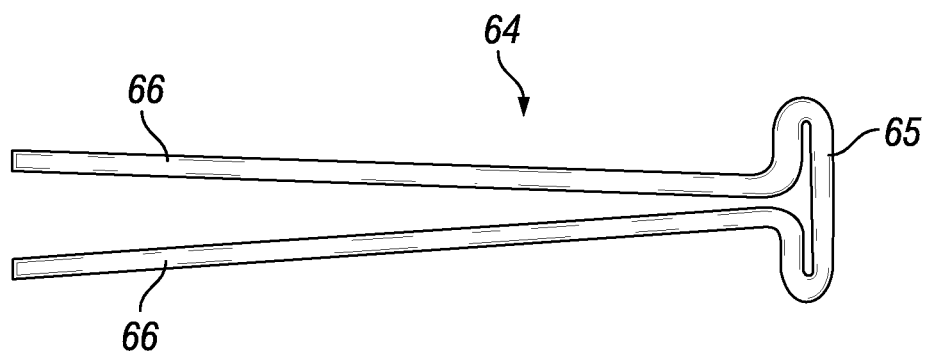
FIG. 8 is a top view of an exemplary split key apart from other components of a catalyst filter basket.
Figure 9:
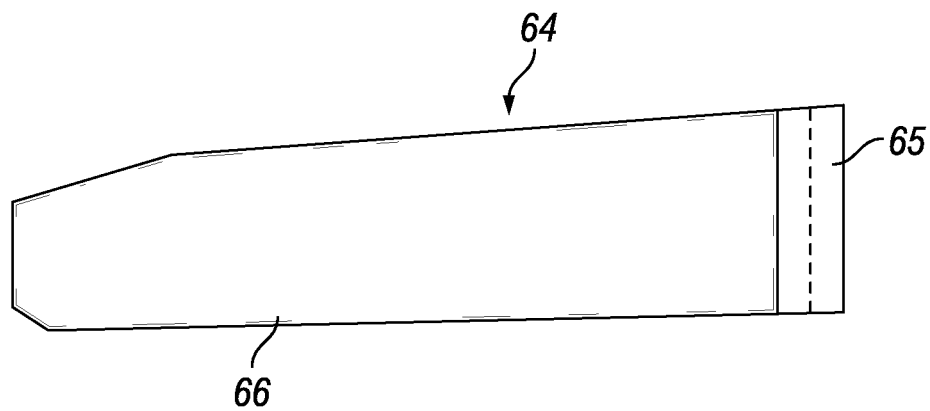
FIG. 9 is a side view of the split key shown in FIG. 8.

In accordance with preferred embodiments, the screen portions 54, 56 of the outer screen assembly 52 are releasably affixed to each other using a quick release mechanism. Releasable attachment of the screen portions 54, 56 can be done using a split key connector. FIGS. 4 and 7 illustrate assembled split key connections which include a slotted plate 62, slotted pin 63 and split key 64. FIGS. 8 and 9 depict an exemplary split key 64 having a head portion 65 and two tang portions 66 which extend away from the head portion 65. To assemble the split key connection, the slotted pin 63 is inserted through slotted plate 62, and frames 58 for each screen portion 54, 56. Thereafter, the tang portions 66 of the split key 64 are passed through slotted pin 63. In order to release the split key connection, the split key 64 is removed from the slotted pin 63. The slotted pin 63 is removed from frames 58, releasing the screen portions 54, 56 from each other.

Figure 10:
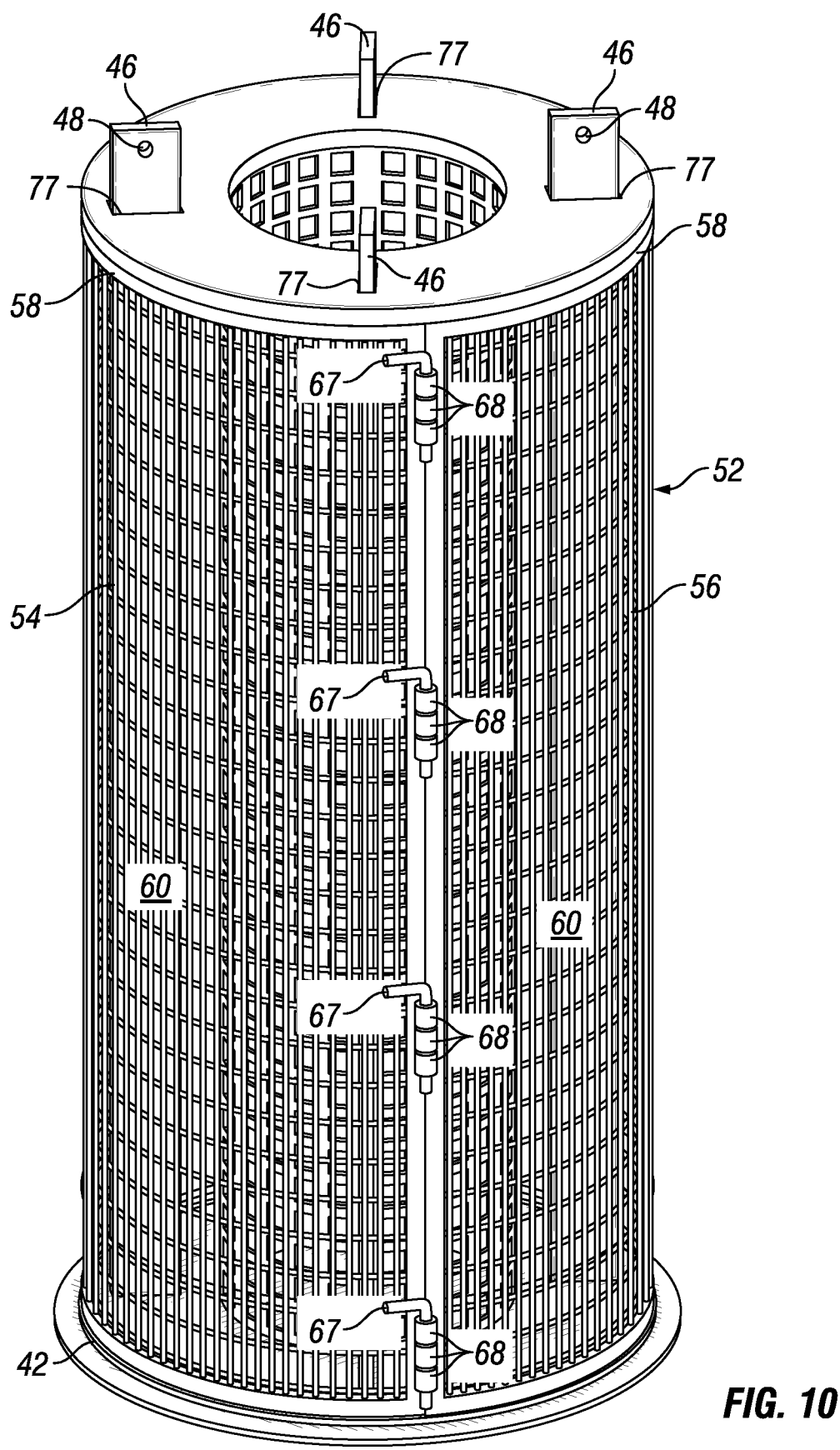
FIG. 10 is an isometric view of an alternative embodiment for a catalyst filter basket in accordance with the present invention.

In an alternative embodiment, draw bolts 67 are used as the quick release mechanism to secure opposing bushings 68 on screen portions 54, 56 together. This arrangement is depicted in FIG. 10. The draw bolt 67 can be slid into the bushings 68 to secure them together, as illustrated in FIG. 10, or slid out of the bushings 68 to allow the bushings 68 to separate and free the screen portions 54, 56 from each other.

In accordance with preferred embodiments, the outer screen assembly 52 is axially locked to the central frame 26 when it is assembled through use of a locking groove arrangement. The locking alignment groove 61 in the frame 58 of each screen portion 54, 56 will receive the ridge 44 of the base ring 28, as best shown by FIG. 5. When this is done, the outer screen assembly 52 will be secured against axial movement with respect to the central frame 26. If desired, the positions of the ridge and locking alignment groove can be reversed such that the ridge 44 is formed on the screen portions 54, 56 and the groove 61 is formed on the base ring 28.

The catalyst filter basket 24 includes a top cover 70 which encloses the catalyst storage area of the filter basket 24 when attached. The top cover 70 includes upper and lower annular discs 72, 74 which are separated from one another by beams 76. The lower disc 74 is perforated by slots 77. The slots 77 are shaped and sized to allow the upper ends 50 of struts 46 to pass through. The lower disc 74 is then secured to the central frame 26 by inserting locking clevis pins 78 through the openings 48 in each strut 46. Each clevis pin 78 is then retained in place by split pin 80 (FIG. 2). The upper disc 72 is secured atop the beams 76. When assembled, a connecting rod 82 extends from the top cover 70 to the base ring 28.

When assembled, solid catalyst material 25 is contained within the catalyst filter basket 24 radially between the inner screen portion 30 and the outer screen assembly 52. The catalyst filter basket 24 is placed onto the catalyst support tray 20 so that the open central shaft 32 of the catalyst filter basket 24 is centered over an opening 22 in the support tray 20. During operation of the catalytic reactor 10, a chemical feed is flowed in through the reactor feed inlet 16. To cross the support tray 20, the chemical feed must pass through the outer screen assembly 52, catalyst material 25 and inner screen portion 30 of the catalyst filter baskets 24 in order to reach the openings 22 of the support tray 20.

As shown in FIG. 2, the catalyst filter basket 24 can be affixed to the support tray 20 by locking levers 43 which engage the lip 42 of the base ring 28. In addition, a hook 84 secures connecting rod 82 to a strut 86 of the support tray 20 to help secure the catalyst filter basket 24 in place. An additional split key 88 can be inserted through a slot 90 in connecting rod 82 to lock the components together.

The inventor has found that the construction of the catalyst filter basket 24 makes it easy to clean and refill the catalyst filter basket 24 with new catalyst material 25 thereby saving significant time and effort. As a result, the present invention also provides a method for cleaning a catalyst filter basket 24. In accordance with the method of cleaning, a catalyst filter basket 24 is first removed from the support tray 20. Preferably, the top cover 70 is removed from the central frame 26. To do this, the split key 88 is removed from the slot 90 of connecting rod 82. Upper disc 72 is removed. Split pins 80 are taken out of the clevis pins 78 and the clevis pins 78 withdrawn from the struts 46. The beams 76 and lower disc 74 can now be removed from the central frame 26. The outer screen assembly 52 is then released and removed from the central frame 26 by releasing the quick release mechanism which is securing the screen portions 54, 56 together. Spent catalyst material 25 can then be swept or washed away from the central frame 26 and other components. To reassemble the catalyst filter basket 24, the screen portions 54, 56 are replaced onto the central frame 26 so that the ridge 44 of the base ring 28 is seated within the groove 61 of each screen portion 54, 56. The quick release mechanisms are then reaffixed to secure the screen portions 54, 56 together. New catalyst material 25 can then be placed into the open upper end of the filter basket 24 and the top cover 72 then secured onto the catalyst filter basket 24.

Those of skill in the art will recognize that numerous modifications and changes may be made to the exemplary designs and embodiments described herein and that the invention is limited only by the claims that follow and any equivalents thereof.

The invention claimed is:

1. A method of cleaning spent catalyst material from a catalyst filter basket, the method comprising the steps of:
   providing the catalyst filter basket having a central frame with a base ring, an inner screen portion extending from the base ring, an outer screen assembly radially surrounding the inner screen portion to define a catalyst storage area radially between the inner screen portion and the outer screen assembly, wherein the outer screen assembly comprises:
   at least two separate screen portions configured to form the outer screen assembly having a generally cylindrical shape, and
   a split key connector configured to secure a first of the separate screen portions to a second of the separate screen portions and further configured to release and detach from the central frame;

removing the outer screen assembly from the central frame to open the catalyst storage area; and cleaning spent catalyst from the catalyst storage area and central frame, wherein the base ring comprises:

an upper annular member comprising a top face, a bottom face, and a v-shaped ridge projecting from an outer circumferential surface of the upper annular member, wherein the inner screen portion protrudes from the top face of the upper annular member; and a lower annular member having a larger diameter than the upper annular member, wherein the lower annular member is configured to attach to the bottom face of the upper annular member.

2. The method of claim 1, wherein the split key connector comprises a slotted plate, a slotted pin, and a split key, wherein the split key comprises a head portion and two tang portions, wherein the slotted pin is configured to be inserted through the slotted plate and each of the first and the second separate screen portion, and wherein each of the two tang portions of the split key are configured to pass through the slotted pin and secure the first and the second screen portions to each other;

the step of removing the outer screen assembly from the central frame further comprising removing the split key from the slotted pin to release the first and the second screen portions from each other.

3. The method of claim 1 wherein the catalyst filter basket further comprises a top cover that is configured to secure to the central frame and enclose the catalyst storage area, the method further comprising:

removing the top cover from the central frame prior to removing the outer screen assembly from the central frame.

4. The method of claim 2, the method further comprising:

reassembling the outer screen assembly after cleaning spent catalyst, the reassembling comprising:

inserting the slotted pin through the slotted plate and each of the first and the second separate screen portions, and passing the tang portions of the split key through the slotted pin.

5. The method of claim 1 wherein the step of removing the outer screen assembly comprises removing the at least two separate screen portions from the central frame.

6. The method of claim 4, wherein each of the at least two separate screen portions comprise a supporting peripheral frame and a central mesh filtering portion, the inserting the slotted pin through the slotted plate and each of the first and the second separate screen portions further comprising inserting the slotted pin through the supporting peripheral frame of each of the first and the second separate screen portions.

7. The method of claim 1, wherein the catalyst filter basket is configured to affix to a support tray, wherein the support tray comprises a locking lever, a strut, a hook, and a connecting rod, wherein the connecting rod is configured to pass through the central frame of the catalyst filter basket, the method further comprising:

affixing the catalyst filter basket to the support tray by inserting a second split key through a slot in the connecting rod; and removing the catalyst filter basket from the support tray by removing the second split key from the slot in the connecting rod.

8. The method of claim 7, further comprising removing the top cover from the central frame by removing the second split key from the slot of the connecting rod.

9. The method of claim 3, wherein the top cover further comprises a lower disc comprising at least one slot, wherein the catalyst filter basket further comprises a support strut extending axially from the base ring, wherein the support strut comprises a lower end that connects to the base ring and an upper end comprising an opening disposed through the support strut, and wherein the upper end of the support strut is configured to pass through the at least one slot of the lower disc, the method further comprising:

passing the upper end of the support strut through the at least one slot of the lower disc.

10. The method of claim 9, wherein the catalyst filter basket further comprises:

a clevis pin comprising a cylindrical body, an end cap at a first end of the clevis pin, and a through hole at a second end of the clevis pin, the clevis pin configured to insert into the opening of the support strut to secure the lower disc to the upper end of the support strut; and a split pin configured to fit inside the through hole of the clevis pin to prevent removal of the clevis pin from the opening of the support strut, the method further comprising:

affixing the lower disc to the upper end of the support strut by passing the clevis pin into the opening of the support strut and then fitting the split pin inside the through hole of the clevis pin; and detaching the lower disc from the upper end of the support strut by removing the split pin from the through hole of the clevis pin and then removing the clevis pin from the opening of the support strut.

11. The method of claim 1 further comprising:

providing the catalyst storage area with a solid catalyst after the catalyst storage area has been cleaned of spent catalyst; and attaching the outer screen assembly to the central frame.

12. The method of claim 2 further comprising:

affixing the outer screen assembly to the central frame by attaching the first screen portion to the second screen portion to each other by inserting the split key from the slotted pin.

13. The method of claim 1, wherein the at least two separate screen portions comprises a locking alignment groove shaped and sized to compliment the v-shaped ridge of the upper annular member, the method further comprising:

fitting the at least two separate screen portions to the upper annular member by locking the locking alignment groove to the v-shaped ridge of the upper annular member.

14. The method of claim 13, wherein fitting the at least two separate screen portions to the upper annular member of the locking alignment groove axially locks the outer screen assembly to the central frame.

15. The method of claim 7, wherein affixing the catalyst filter basket to the support tray further comprises engaging the locking lever to a lip of the base ring and securing the connecting rod to the strut of the support tray by the hook.

\* \* \* \* \*